United States Patent Office 2,943,121  
Patented June 28, 1960

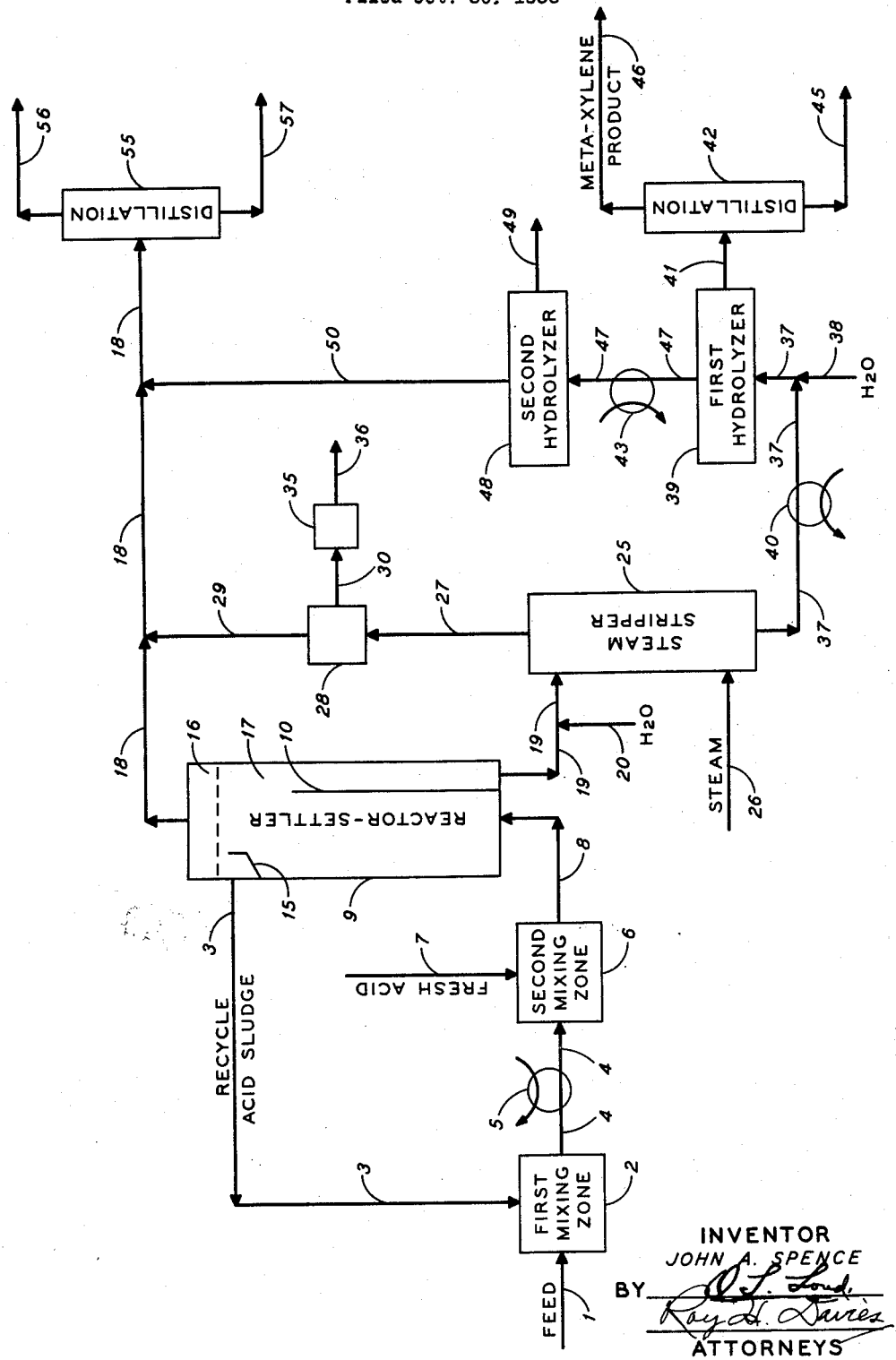

2,943,121

SEPARATION OF META-XYLENE FROM ISOMERIC XYLENE MIXTURES

John A. Spence, San Anselmo, Calif., assignor to California Research Corporation, San Francisco, Calif., a corporation of Delaware Filed Oct. 30, 1956, Ser. No. 619,290

6 Claims. (Cl. 260—674)

The present invention relates to the production of high-purity meta-xylene from hydrocarbon mixtures comprising meta-xylene and at least one other xylene isomer, and particularly to an improved method for selectively sulfonating the meta-xylene present in such mixtures, and for separating meta-xylene from the resulting xylene sulfonic acids.

Selective sulfonation has been used in various prior art processes for producing meta-xylene from mixtures comprising other xylene isomers. These processes are based on the fact that meta-xylene is more readily sulfonated than the other xylenes, and on the fact that xylene sulfonic acids resulting from sulfonation can be selectively hydrolyzed to the corresponding xylenes.

Thus, it has been known heretofore, that the partial sulfonation of a crude xylene fraction, for example, with a moderately strong sulfuric acid under conditions preventing complete sulfonation could be made to dissolve or sulfonate a substantial portion of the meta-xylene content of the crude xylene, without the accompanying sulfonation of nearly as substantial a portion of the other xylenes. It has also been known that the sulfonic acid resulting from this sulfonation could be separated from the unsulfonated oil, that the separated unsulfonated oil could be sulfonated to produce an additional sulfonic acid fraction, and that the xylenes present in the two different sulfonic acid fractions thus obtained could be separated by selective hydrolysis, fractional crystallization, or a combination of the two procedures.

It is apparent that the selectivity of sulfonation of the meta-xylene present in the original mixture is an important factor in determining the purity of the recovered meta-xylene. Increasing the percentage of meta-xylene sulfonic acid present in the xylene sulfonic acids resulting from sulfonation increases the amounts of meta-xylene that can be separated from the xylene sulfonic acids, and reduces the amounts of undesired xylene isomers that will separate out with the metaxylene during the separation step. Heretofore, the degree of meta-xylene sulfonation selectivity in these sulfonation processes has left much to be desired, and the resulting undue amount of sulfonation of undesired xylene isomers has meant inefficient and costly utilization of acid, and other process inefficiencies. In the face of the large and growing commercial demand for high-purity meta-xylene, i.e., meta-xylene of at least 95% purity, efficient production thereof is of great importance. This is particularly so in large scale operations requiring high-purity meta-xylene for the production of intermediates for products that must enter price competition with similar products, for example, processes using high-purity meta-xylene for the production of isophthalic acid for subsequent conversion to plastics. Accordingly, it is an object of the present invention to provide an improved process comprising selective sulfonation in which the meta-xylene sulfonation selectivity in the sulfonation step and the efficiency of acid utilization are high, and with which meta-xylene of at least 95% purity may be produced.

In accordance with the present invention there is provided a process for producing meta-xylene of high purity from a first mixture comprising meta-xylene and at least one other xylene isomer which comprises: contacting said first mixture in a first contacting zone with a recycle stream comprising xylene sulfonic acid and dilute sulfuric acid; passing the resulting second mixture to a second contacting zone and there contacting said second mixture with fresh sulfuric acid; separating from the resulting third mixture a first phase substantially comprising unsulfonated oil lean in meta-xylene and a second phase comprising xylene sulfonic acids and dilute sulfuric acid, but substantially free from unsulfonated oil; obtaining said recycle stream from a portion of said separated second phase; and recovering meta-xylene from the remaining portion of said separated second phase.

The novel features of the present invention are set forth with particularity in the appended claims. The invention will best be understood, however, both as to organization and operation, and additional objects and advantages thereof will be apparent, from the following description, when read in connection with the accompanying drawing. The single figure there shown is a diagrammatic view, including flow paths, of an embodiment of the present invention.

The feed stocks for the process of the present invention may comprise from about 20% by volume to about 80% by volume of meta-xylene. The process is particularly attractive for producing high-purity meta-xylene from feed stocks having a meta-xylene concentration of from about 35% by volume to about 70% by volume. The feed stocks for the process may be derived, for example, from hydroformed non-aromatic petroleum fractions. These feed stocks may be reduced in undesired xylene isomer content prior to being used in the present process by conventional methods capable of removing the undesired isomers. For example, the ortho-xylene content may be reduced by distillation, although meta-xylene and para-xylene cannot be separated economically by presently available distillation methods. The composition of typical feed stocks suitable for use in the practice of the present invention is indicated in the following examples:

|  | Example 1, volume percent | Example 2, volume percent |
|---|---|---|
| Non-aromatics | 15.0 | 10.2 |
| Ethyl Benzene | 15.0 | 13.8 |
| Para-xylene | 18.0 | 8.5 |
| Meta-xylene | 45.0 | 51.5 |
| Ortho-xylene | 7.0 | 16.0 |
|  | 100.0 | 100.0 |

Referring now to the drawing, the hydrocarbon feed mixture containing meta-xylene and at least one other xylene isomer is passed through line 1 to first contacting or mixing zone 2, where it is contacted with a recycle stream passed through line 3 from reactor-settler 9. This recycle stream contains xylene sulfonic acids, free acid and a minor amount of dissolved, unsulfonated oil but is substantially free of unsulfonated oil as a separate phase. In first mixing zone 2 the feed stream and the recycle stream are mixed vigorously to facilitate the transfer of meta-xylene to the recycle acid phase, thereby enriching the recycle acid phase with meta-xylene. The operating conditions of the process are adjusted to maintain the acid concentration and temperature of the recycle stream at values, for example, 81% $H_2SO_4$ and 150° F. respectively, that will make the acid substantially ineffective as a sulfonating agent, thereby making it possible to enrich the acid phase with dissolved meta-xylene prior to sulfonation, which is accomplished with fresh concentrated acid in a subsequent step.

The effluent from first mixing zone 2 is passed through line 4 and heat-exchanger 5 to second contacting or mixing zone 6. Heat-exchanger 5 is provided to cool the stream flowing in line 4 by removing heat therefrom to control the temperatures in reactor-settler 9 and hence in the recycle stream flowing in line 3. In second mixing zone 6, the effluent from first mixing zone 2 is mixed with fresh concentrated sulfuric acid, preferably oleum, in strength and amounts sufficient to secure the desired depth of sulfonation. It has been found that with vigorous mixing in second mixing zone 6 a substantial portion of the total sulfonation desired is completed at or near the point of mixing; the reaction is very rapid, with experiments indicating that as much as 50% of the total reaction is completed within the first second with each increment of fresh acid added to mixing zone 6. Thus, it may be seen that in the present process it is possible to accomplish substantial sulfonation out of contact with the unsulfonated oil in reactor-settler 9 and thereby to greatly increase meta-xylene sulfonation selectivity and acid utilization efficiency. The effluent from second mixing zone 6 is passed through line 8 to reactor-settler 9 and is passed upwardly therethrough at relatively low velocity, for example 2 to 8 ft./min., and preferably about 5 ft./min. The unsulfonated oil coalesces and flows upwardly in reactor-settler 9 at a greater rate than the acid sludge phase because of its lower density. Reactor-settler 9 serves a three-fold purpose: (1) it provides residence time for a continuation of the sulfonation reaction; (2) it provides settling time for the net unsulfonated oil that separates from the acid phase; and (3) it provides settling volume for the net acid phase sludge produced. Residence time in reactor-settler 9 for the effluent from second mixing zone 6 may be from about 1 to 3 hours, and preferably about 2 hours. Some sulfonation of xylenes continues in reactor-settler 9; however, the major portion of the desired sulfonation has been accomplished by the time the effluent from second mixing zone 6 reaches reactor-settler 9. Because of coalescence and its low density the unsulfonated oil phase rises to form layer 16 in reactor-settler 9 above the acid phase 17 therein.

From reactor-settler 9 the recycle acid stream hereinbefore described is withdrawn through line 3 from a pocket formed in acid phase 17 by barrier 15, provided to prevent unnecessary turbulence. From reactor-settler 9 an acid sludge-free stream of unsulfonated oil is withdrawn through line 18 and passed to distillation system 55 for removal of small amounts of polymers and color bodies through line 57. Recovered unsulfonated oil is withdrawn through line 56.

From reactor-settler 9 a portion of acid phase 17 is continuously withdrawn as a stream by way of a pocket formed by barrier 10 and is passed through line 19 into contact with a stream of water flowing in line 20. This withdrawn stream may contain, as meta-xylene sulfonic acid, about 50% of the meta-xylene that entered the system in the feed in line 1. Further, the meta-xylene sulfonic acid present in the stream may be about 85% of the total sulfonic acids present in the stream. The stream also contains a quantity of dissolved unsulfonated oil that must be removed to prevent its adverse effect on the purity of the meta-xylene subsequently separated from the meta-xylene sulfonic acid. This unsulfonated oil is removed from the stream by steam stripping in conventional steam stripper 25, after a sufficient amount of water has been added through line 20 to reduce the concentration of the sulfuric acid in line 19 to about 70%. The thus diluted stream which enters steam stripper 25 through line 19 is passed downwardly through steam stripper 25 in countercurrent contact with steam introduced into steam stripper 25 through line 26. Steam stripper 25, which may be a conventional packed countercurrent steam stripper, may be maintained at a desired pressure by means of an evacuation system 35 on condenser 28 which reduces pressure on condenser 28, and hence on steam stripper 25, through lines 30 and 36. The rate of steam introduction into steam stripper 25 through line 26 may be adjusted as necessary to maintain the stripper bottoms at a desired temperature. Stripped hydrocarbons and steam are withdrawn from steam stripper 25 through line 27 and are condensed in condenser 28. The hydrocarbons so condensed are then passed from condenser 28 through line 29 to line 18 for further processing as hereinbefore described. The stripped sludge stream from steam stripper 25 is passed through line 37 to first hydrolyzer 39, after having been heated in heat exchanger 40 and diluted with water introduced through line 38 to an extent sufficient to obtain a desired amount of hydrolysis in first hydrolyzer 39 within a desired time. For example, the stream in line 37 may be heated to about 310° F. by heat exchanger 40 and sufficient water may be introduced through line 38 to reduce the sulfuric acid concentration in the stream in line 37 to about 28%. Under these conditions sufficient hydrolysis to obtain a production of 95% pure meta-xylene may be obtained with a residence time in first hydrolyzer 39 of about 1.5 hours. The acid layer from first hydrolyzer 39 is passed through line 47 and heat exchanger 43 to second hydrolyzer 48. In heat exchanger 43 this acid layer is heated to, for example, 375° F., to facilitate hydrolysis in second hydrolyzer 48. A residence time of about two hours in second hydrolyzer 48 suffices to hydrolyze the remaining sulfonic acids in this acid layer. A hydrocarbon stream lean in meta-xylene is passed from second hydrolyzer 48 through line 50 to line 18 for subsequent processing as hereinbefore described. From second hydrolyzer 48 sulfuric acid of, for example, 55% concentration is recovered through line 49.

A hydrolysis product from first hydrolyzer 39 is passed through line 41 to convention distillation system 42. In distillation system 42 a small quantity of polymers and color bodies are separated and withdrawn through line 45, and a net product stream of meta-xylene of at least 95% purity is withdrawn through line 46.

The foregoing detailed description of the operation of the illustrated embodiment of the present invention will be better understood from the following example, which is illustrative of process conditions during a typical operation of the embodiment shown.

EXAMPLE 3

| | |
|---|---|
| Feed in line 1 | The stock indicated in Example 1. |
| Recycle acid sludge in line 3 | Flow rate about 19 vols. recycle sludge/vol. feed in line 1; 150° F.; 81% H₂SO₄ concentration. |
| Line 4 temperature downstream from heat exchanger 5 | 141° F. |
| Acid in line 7 | 20% fuming H₂SO₄ (flow rate chosen to result in desired depth of sulfonation). |
| Reactor-settler 9 | Average temperature of contents 150° F.; residence time for contents two hours. |
| Net acid product sludge withdrawn from reactor-settler 9 through line 19 | (Flow rate about 0.4 vol. sludge per vol. feed in line 1; containing, as meta-xylene sulfonic acid, 49% of the meta-xylene entering the system through line 1, said meta-xylene sulfonic acid being 86% of the total sulfonic acids in line 19). |
| Line 19, downstream from point of water addition through line 20 | 70% H₂SO₄ concentration; contains about 6.5% dissolved oil. |
| Line 37, upstream from heat exchanger 40 | 225° F.; contains less than 1% dissolved oil. |
| Steam stripper 25 | Packed, countercurrent stripper. |

EXAMPLE 3—Continued

| | |
|---|---|
| Line 37, downstream from point of water addition through line 38 | 310° F.; 28% $H_2SO_4$ concentration. |
| First hydrolyzer 39 | 1.5 hours residence time for contents; 75% hydrolysis of sulfonic acids in contents. |
| Line 47, downstream from heat exchanger 43 | 375° F. |
| Second hydrolyzer 48 | 2.0 hours residence time for contents; substantially complete hydrolysis of sulfonic acids in contents. |
| Line 49 | 55% $H_2SO_4$, recovered for subsequent refortification; flow rate about 0.38 vol./vol. feed in line 1. |
| Line 46 | 95% purity meta-xylene; flow rate about 0.19 vol./vol. feed in line 1. |
| Line 56 | Hydrocarbons containing 34 vol. percent meta-xylene, 22 vol. percent para-xylene, 9 vol. percent ortho-xylene, 19 vol. percent ethyl benzene, and 16 vol. percent non-aromatics; flow rate about 0.77 vol./vol. feed in line 1. |

It will be seen from the foregoing that, in contrast to previous processes, a major portion of the sulfonation in the process of the present invention is accomplished out of the presence of the relatively large amounts of the relatively low meta-xylene content unsulfonated oil accumulated in layer 16. This method of operation contributes in large measure to an increase in selectivity of meta-xylene sulfonation, for the same depth of sulfonation, and to an increase in efficiency of acid utilization, because acid is not expended in sulfonating the relatively large quantities of undesired isomers of meta-xylene present in layer 16. These improved results are further illustrated by the following Examples 4 and 5, in each of which the runs were continuously made in laboratory scale equipment comprising a reactor-settler 9, first mixing zone 2, and second mixing zone 6, arranged and connected as shown in the drawing. In Example 4 the contents of reactor-settler 9 were stirred, so that the recycle stream in line 3 would contain a mixture of the sulfonic acids and accumulated unsulfonated oil from reactor-settler 9, and therefore so that sulfonation in second mixing zone 6 would be accomplished in the presence of accumulated unsulfonated oil, to simulate practice in previous processes. In Example 5 reactor-settler 9 was not stirred, so that the recycle stream in line 3 would be substantially free of unsulfonated oil, in accordance with the present invention. In all runs in both Examples 4 and 5 the line 1 feed composition was 45.7 vol percent meta-xylene, 37.1 vol. percent other $C_8$ isomers, and 17.2 vol. percent paraffins, and the acid used was 20% fuming $H_2SO_4$ (expressed in Examples 4 and 5 in terms of equivalent 100% $H_2SO_4$).

If depth of sulfonation is plotted against selectivity, for each of Examples 4 and 5, the following selectivities for even intervals of sulfonation depth may be obtained from the resulting curves:

| Depth of Sulfonation, wt. percent | Example 6 (from data of Ex. 4) | Example 7 (from data of Ex. 5) |
|---|---|---|
| | Selectivity, wt. percent | |
| 30 | 86.0 | 89.0 |
| 35 | 84.9 | 87.7 |
| 40 | 83.7 | 86.3 |
| 45 | 82.5 | 85.0 |

In both Examples 6 and 7 it is seen that selectivity decreases as depth of sulfonation increases, but it may also be seen that the method of the present invention (Example 7) results in higher selectivity for a given sulfonation depth, throughout the range of the data, than the method (Example 6) wherein sulfonation was carried out in the presence of accumulated unsulfonated oil to simulate practice in previous processes.

In the practice of the present invention it is desirable that the recycle acid sludge stream in line 3 flow at the rate of at least 10 volumes of acid sludge per volume of feed in line 1, and preferably between 15 and 20 volumes of recycle per volume of feed, because thereby substantially optimum meta-xylene sulfonation selectivity may be obtained. This is illustrated by the following Example 8, which shows data derived from a series of continuous runs made with identical feed and with the equipment arrangement used to obtain the data in Examples 4 and 5; the observed selectivities were adjusted to a common depth of sulfonation to give the selectivities shown.

EXAMPLE 8

| Ratio of volumetric flow rate of recycle stream in line 3 to volumetric flow rate of feed in line 1 | Selectivity of meta-xylene sulfonation in terms of meta-xylene sulfonic acid in total sulfonic acids in line 19, wt. percent. |
|---|---|
| 3.5 | 76.4 |
| 4.5 | 77.6 |
| 10.0 | 84.3 |
| 12.0 | 84.9 |
| 20.0 | 85.1 |
| 200.0 | 85.8 |

From Example 8 it will be seen that little gain results from increasing above about 20:1 the ratio of the flow rate in line 3 to the flow rate in line 1, and in view

EXAMPLE 4

| Run No. | Ratio of line 3 recycle rate to 1 feed rate | Mol ratio of line 7 acid to line 1 meta-xylene | Line 3 recycle temperature, °F. | Depth of sulfonation, in terms of total $C_8$ aromatics in line 1 that are sulfonated, wt. percent | Selectivity, in terms of the meta-xylene sulfonic acid content of the total $C_8$ aromatic sulfonic acids in line 19, wt. percent |
|---|---|---|---|---|---|
| 8 | 200:1 | 1.23 | 120 | 29.3 | 85.9 |
| 10 | 200:1 | 1.37 | 155 | 36.7 | 84.5 |
| 13 | 200:1 | 0.77 | 115 | 20.3 | 88.3 |

EXAMPLE 5

| 11 | 200:1 | 1.45 | 170 | 44.4 | 84.7 |
| 12 | 200:1 | 1.45 | 150 | 41.5 | 86.4 |
| 15 | 200:1 | 0.90 | 155 | 32.7 | 88.3 | of recycle pumping costs, 20:1 is therefore a practical upper limit, despite the fact that the data do show a meta-xylene sulfonation selectivity increase at least up to a 200:1 recycle ratio.

By the terms "first mixing zone 2" and "second mixing zone 6," as used herein is meant any means capable of effecting a high degree of turbulence such as may be obtained with line baffles, orifice plates and venturi sections. Those skilled in the art will appreciate that such means may comprise pumps, baffle sections in heat exchangers, and the like which, if capable of accomplishing the desired high-turbulence mixing, may dispense with the necessity for process equipment designed primarily for mixing. The pipe diameters for lines between mixing zones 2 and 6, and between mixing zone 6 and reactor-settler 9, preferably should be selected to provide flow velocities characterized by a Reynolds number well within the turbulent region. Vigorous mixing is especially desirable in second mixing zone 6. Such mixing, coupled with the addition of the recycle sulfonic acids and free acid in the previous mixing zone 2, minimizes those local and momentary high acid concentrations, in mixing zone 6, which otherwise would adversely affect meta-xylene sulfonation selectivity.

From the foregoing it may be seen that with the process of the present invention meta-xylene of high purity may be produced from hydrocarbon mixtures comprising meta-xylene and at least one other xylene isomer with high metaxylene sulfonation selectivity and efficient acid utilization.

Although only specific arrangements and modes of construction and operation of the present invention have been described and illustrated, numerous changes could be made in those arrangements and modes without departing from the spirit of the invention, and all such changes that fall within the scope of the appended claims are intended to be embraced thereby.

What is claimed is:

1. A continuous process for separating metaxylene from hydrocarbon feeds consisting predominantly of xylene isomers and having a substantial content of meta-xylene which comprises passing one volume of the hydrocarbon feed with at least 10 volumes of a recycle stream consisting essentially of xylene sulfonic acids and sulfuric acid into a first mixing zone, the xylene sulfonic acid component of the recycle stream consisting predominantly of metaxylene sulfonic acid and the sulfuric acid component of the recycle stream having a concentration below that necessary for effective sulfonation at the temperature of said first mixing zone, passing the effluent from the first mixing zone into a second mixing zone together with concentrated sulfuric acid, the quantity of concentrated sulfuric acid introduced into the second mixing zone being sufficient to sulfonate not more than about 50% of the aromatic hydrocarbons contained in the feed at the temperature prevailing in the second mixing zone and in the reactor-settler zone referred to hereinafter, passing the effluent from the second mixing zone into a reactor-settler zone to separate a hydrocarbon phase and a xylene sulfonic acid-sulfuric acid phase, withdrawing the hydrocarbon phase from the reactor-settler zone, withdrawing the major portion of the xylene sulfonic acid-sulfuric acid phase to constitute the recycle stream, and withdrawing the minor proportion of said phase and subjecting it to hydrolysis under hydrolysis conditions to liberate a metaxylene rich product.

2. A process for separating meta-xylene of high purity from a first mixture comprising meta-xylene and at least one other xylene isomer, which comprises: contacting said first mixture in a first contacting zone with a recycle stream comprising xylene sulfonic acids and sulfuric acid having a concentration below that necessary for sulfonation of xylenes at the temperature of said first contacting zone; passing the resulting second mixture to a second contacting zone and there contacting said second mixture with concentrated fresh sulfuric acid; separating from the resulting third mixture a first phase substantially comprising unsulfonated oil lean in meta-xylene and a second phase comprising xylene sulfonic acids but substantially free from unsulfonated oil; obtaining said recycle stream from a portion of said separated second phase; and recovering meta-xylene from the remaining portion of said separated second phase.

3. A process for separating high-purity meta-xylene from a first hydrocarbon mixture of xylene isomers including meta-xylene, which comprises: forming a second mixture comprising said first mixture, sulfonic acids and sulfuric acid having a concentration insufficient to cause substantial sulfonation at the temperature of said second mixture; selectively sulfonating meta-xylene in said second mixture with concentrated fresh sulfuric acid to produce a third mixture comprising sulfonic acids and unsulfonated hydrocarbons; substantially separating said sulfonic acids from said unsulfonated hydrocarbons; utilizing a portion of said separated sulfonic acids to form said second mixture; and recovering meta-xylene from the remaining portion of said separated sulfonic acids.

4. A process as in claim 3, in which meta-xylene is recovered from said remaining portion of said separated sulfonic acids by: contacting said remaining portion with water to reduce the concentration of the sulfuric acid therein; steam stripping the resulting stream comprising said remaining portion and water to remove dissolved unsulfonated oil therefrom; contacting the stripped stream with water to reduce the concentration of the sulfuric acid therein; hydrolyzing in a first hydrolysis stage at a temperature above the atmospheric boiling temperature of metaxylene a substantial portion of the sulfonic acids in the resulting stream comprising said stripped stream and water; separating the products of said first hydrolysis stage into an acid layer fraction and a hydrocarbon fraction rich in meta xylene; separating high-purity meta-xylene from said hydrocarbon fraction by distillation; hydrolyzing in a second hydrolysis stage sulfonic acids in said acid layer fraction; and separating the products of said second hydrolysis stage into an acid layer fraction and a hydrocarbon fraction lean in meta-xylene.

5. A process as in claim 4, in which said unsulfonated hydrocarbons separated from said third mixture, said dissolved unsulfonated oil removed by said steam stripping, and said hydrocarbon fraction from said second hydrolysis stage are passed to a distillation system for recovering therefrom a hydrocarbon product lean in meta-xylene.

6. In a process for separating meta-xylene from a hydrocarbon feed comprising meta-xylene and at least one other xylene isomer by differential sulfonation in a sulfonation zone to produce a mixture comprising xylene sulfonic acids, and by subsequent separation of meta-xylene from said mixture, the improvement which comprises: continuously supplying said feed to said zone in admixture with a recycle stream containing xylene sulfonic acids rich in metaxylene sulfonic acid and containing sulfuric acid at a concentration insufficient to cause sulfonation at the temperature of said zone, continuously supplying concentrated sulfuric acid to said zone, maintaining the contents of said zone in a highly turbulent state under conditions effective to produce a desired depth of sulfonation, continuously withdrawing from said zone a reaction mixture comprising xylene sulfonic acids sulfuric acid and unsulfonated oil, separating from said reaction mixture a phase comprising said xylene sulfonic acids and sulfuric acid but substantially free from said unsulfonated oil, recovering meta-xylene from a portion of said phase, and continuously recycling another portion of said phase into admixture with said hydrocarbon feed to said zone.

(References on following page)

References Cited in the file of this patent

UNITED STATES PATENTS

| | | |
|---|---|---|
| 2,470,896 | Mavity | May 24, 1949 |
| 2,511,711 | Hetzner | June 13, 1950 |
| 2,519,336 | Beach et al. | Aug. 22, 1950 |
| 2,848,483 | Reif et al. | Aug. 19, 1959 |

OTHER REFERENCES

Brooks et al.: The Chemistry of Petroleum Hydrocarbons, vol. III, Reinhold Publishing Corp. 430 Park Avenue, New York 22, N.Y., page 615.